UNITED STATES PATENT OFFICE.

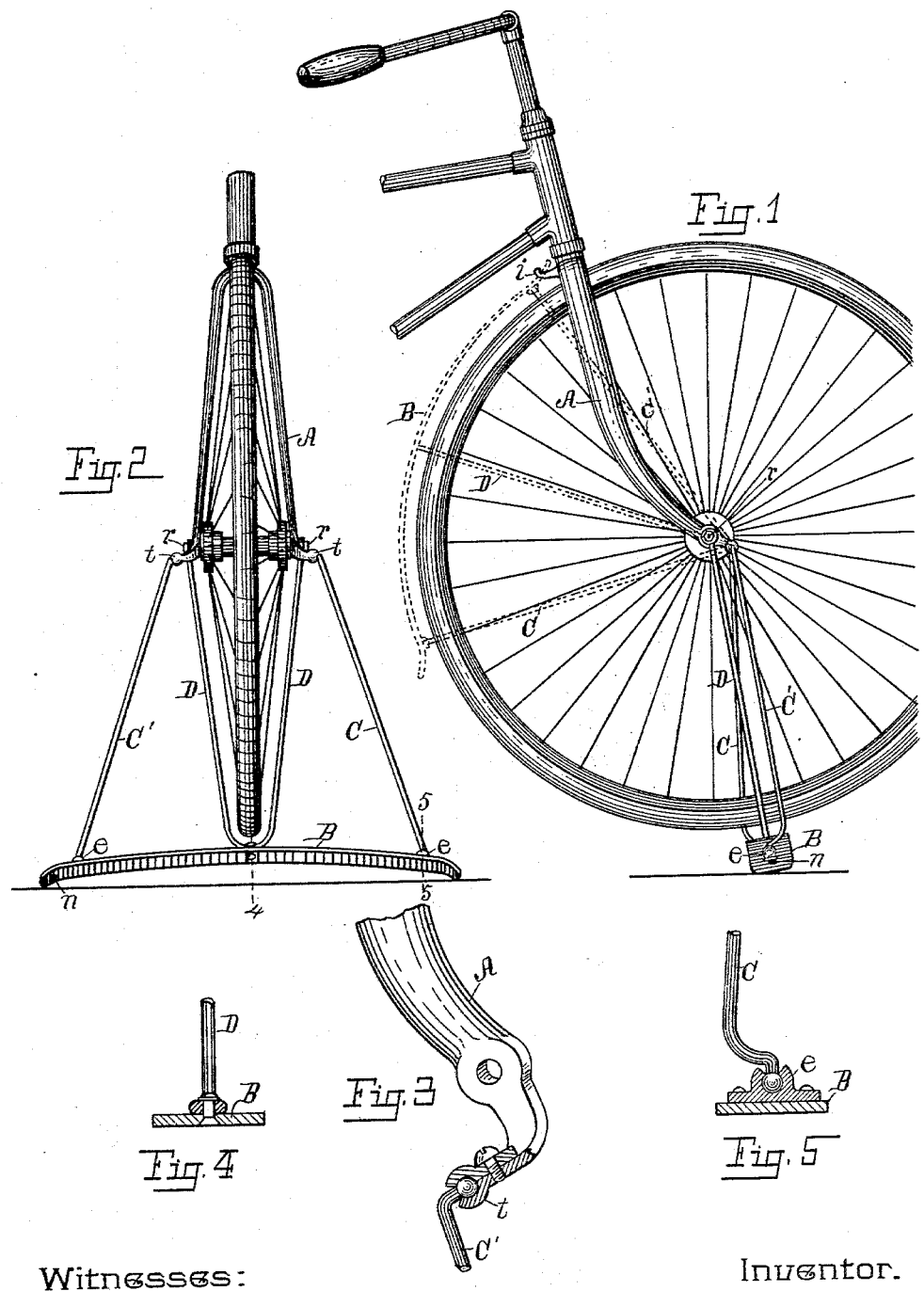

MAURICE E. BLOOD, OF KALAMAZOO, MICHIGAN, ASSIGNOR TO THE KALAMAZOO CYCLE COMPANY, OF SAME PLACE.

SUPPORT FOR BICYCLES.

SPECIFICATION forming part of Letters Patent No. 551,344, dated December 10, 1895.

Application filed May 10, 1893. Serial No. 473,740. (No model.)

*To all whom it may concern:*

Be it known that I, MAURICE E. BLOOD, residing at Kalamazoo, in the county of Kalamazoo and State of Michigan, have invented a new and useful Support for Bicycles, of which the following is a specification.

The object of this invention is to provide a means for supporting a bicycle in an upright position without being obliged to have it rest against some object for this purpose when left alone. I attain this object by the device illustrated in the accompanying drawings, in which—

Figure 1 is a side elevation of the forward part of a bicycle with this invention attached, showing the supporting stand or device for holding the bicycle in an upright position, this stand or device being convertible into either a supporting-stand for the bicycle or a front-wheel mud-guard, the dotted lines in this figure showing the position it occupies when used as a mud-guard. Fig. 2 is a front elevation or view of the bicycle with the devices of this invention in the same position as shown in Fig. 1. Fig. 3 is an enlarged detail, being a perspective view of one side of the lower part of the fork of a bicycle, and a section across the center of the ball-joint connection of the upper end of the brace or arm which forms a brace to the bicycle support or stand. Fig. 4 is an enlarged detail, being a cross-section on line 4 of Fig. 2, showing the manner of attaching the center braces of the supporting-stand to the base of the stand, or the part that is used for both the base of the stand and the mud-guard of the front-wheel; and Fig. 5 is a enlarged detail, being a cross-section on line 5 5 of Fig. 2 of the center of the parts which form a connection between the lower end of the outside brace and the outer end of the mud-guard or base of the supporting-stand.

Similar letters refer to similar parts throughout the several views.

A represents the front fork of the bicycle.

B represents the part which forms the base of the supporting-stand and is also used for a mud-guard to the front wheel. It is made of thin flat metal, preferably steel, that is adapted to bend flatwise to assume the proper curve for a mud-guard when it is set for that purpose behind the wheel and then be straightened out or curved in the opposite direction to form the base or rest for the supporting-stand when it is in position under the wheel. The said mud-guard and base B is made to assume these different shapes and positions and is held in place by means of the brace-rods C C and D D. The lower or outer brace-rods C C, connecting with the mud-guard or base B near each end of the said base with the universal or ball joints $e$ $e$, will not bind in the various positions assumed by these devices as they are used, the upper ends of these outer braces C C being held in similar joints $l$ $l$ at the ends of the fork A.

The inner braces D D are made much as mud-guard braces are usually made to connect with the wheel-axle at one end and be bent around or joined together where they meet and join the mud-guard at the other end, only in this device these braces must have a connection at the inner end to allow the opposite end to swing in a circle corresponding with the rim of the wheel of the bicycle, and where the said braces D D are joined to the mud-guard, as shown at line 4, Fig. 2, the connection must be made substantially like a swivel or in a manner to allow the mud-guard to pivot centrally at this point, while the outer ends are free to swing in a circle, the said braces D D being the axis for the guard to revolve on.

By making the braces and their connections in the manner just described the mud-guard or base B can be turned to stand at right angles with the rim of the wheel of the bicycle or to run parallel with such rim.

To hold the mud-guard or base B in place when set for a mud-guard, there is a hole $n$ in one end of the guard to fit on the hook $i$ at the junction of the fork A. This hook $i$ can be fixed rigidly to the fork and the end of the mud-guard made to spring over it, or it can have a yielding or spring connection to the fork that will allow it to yield to connect with the mud-guard. When the mud-guard is used for a base and support for the bicycle it is dropped down and turned crosswise of the wheel on the ground and the wheel is then drawn backward over the said mud-guard or base until the center of the wheel has passed over and beyond it, when the said base B and braces C C and D D will become fixed or stationary in their relation to the fork A and prevented from moving further in a forward direction, as relates to such fork, by means of the braces C C locking or working against the braces D D, as shown in Fig. 1. The upper ends of these braces being pivoted on different centers, the tendency will be to arrest further forward movement of the base B after it has passed forward of the center of the wheel. The further forward movement of the said base and braces might also be arrested by stops fixed to the fork A to come forward of and against the said braces below their upper pivot-points at the proper time. At the time when the base B reaches the extreme forward position and becomes locked the wheel will be raised from the ground and its weight, as well as the forward part of the bicycle, will come on the said base B, but in a vertical line to the rear of the said base, thereby preventing a tendency of the bicycle to run forward. It can readily be seen by examining the drawings that when the devices and their several parts just described are in this position the bicycle will not only be held in an upright position from tipping, but it will also be kept from running forward or backward and the front wheel will be held from twisting around in the steering-head bearings, all of which it will be necessary to do to make the bicycle stand securely in an upright position.

I use the forward mud-guard in this device, as it seems to be about the only part of a bicycle, as they are now made, that can be readily converted into a stand to support a bicycle, and it is desirable to add as little as possible to the parts of a bicycle to form a portable stand to be carried with it.

To set the stand to hold the bicycle, the mud-guard or base B is unhooked from the hook $i$ and allowed to drop down on the ground. The braces C C and D D will cause the base B to turn crosswise of the wheel when falling. When this base has reached the ground the wheel may be pulled over it and backward until further movement in that direction is stopped by means of the locking features of the braces, as before described. To set the stand back as a mud-guard, the wheel is pushed forward over the base B until the base is lying back of it loosely on the ground, when the operator takes hold of the end of the base having the hole $n$ through it and lifts that end up to the hook $i$, hooking it thereon, when the bicycle will again be ready for use.

Having thus described my invention, what I claim as new, and desire to secure by Letters Patent of the United States, is—

1. The combination with a bicycle of a mud guard for the forward wheel thereof; arms, C, C', pivotally connected to the fork of the bicycle and to each end of the mud guard, B, by universal joints; a central brace, D, connected by a swivel joint to the central portion of said mud guard and pivotally connected to the fork, A, of the bicycle to permit of the mud guard being swung below and transverse to the direction of the forward wheel to serve as a bicycle support, as specified.

2. The combination with a bicycle of a mud guard pivotally connected thereto by suitable arms to swing below and across the path of the wheel to be used as a support for the bicycle, as specified.

3. A mud guard for bicycles formed of a flexible strip of metal adapted to bend to conform to the curvature of the rim of the wheel when used as a mud guard; suitable arms pivotally connected thereto for supporting the same so that the mud guard can be swung below the wheel and straightened or curved in the opposite direction, to serve as a stand or support for the bicycle, substantially as set forth.

4. The combination with a bicycle of a mud guard composed of a flexible strip adapted to conform to the rim of the wheel; braces pivotally connected to the center of said mud guard and to each end thereof, said braces being pivotally attached to different centers so that the mud guard can be swung down and across the wheel, and the difference in the pivoting of the supports will cause the same to straighten to form a stand for the bicycle, as specified.

5. A mud guard or base B having the braces D D attached to it nearly midway between its ends with a pivoted connection that will allow the said mud guard or base B to revolve on said pivot and braces, substantially as set forth.

6. A mud guard or base, B, having braces, C, C', pivotally connected thereto and to the forks toward the central part of the wheel to permit the mud guard to be swung below and across the path of the wheel to be used as a support for the bicycle, as specified.

7. A mud guard in combination with braces D D adapted to swing at their outer ends in a circle corresponding to the rim of the wheel and a brace C adapted to swing at its outer end obliquely to the rim of the wheel, substantially as and for the purpose specified.

8. The combination with a bicycle of a support, B, adapted to rest upon the ground beneath the wheel and lie transverse to the path thereof; braces, C, C', pivoted to an extension below the lower end of the fork thereof and pivotally connected toward each end of the support, B; a central brace, D, pivoted to the fork opposite the hub of said bicycle and connected by a swivel joint near the center of said support, B; a suitable hook toward one end of the base, B, to attach to the upper portion of the fork to hold the base in position to serve as a mud guard to the forward wheel when not in use as a support, all co-acting together substantially as specified.

MAURICE E. BLOOD.

Witnesses:
H. M. KINDLE,
HATTIE E. CARD.